3,185,538
PROCESS FOR COLORING POLYACRYLONITRILE FIBERS WITH METHINE DYE SALTS
Jacques Voltz, Basel, and Werner Bossard, Riehen, near Basel, Switzerland, assignors to J. R. Geigy A.-G., Basel, Switzerland
No Drawing. Filed Apr. 1, 1963, Ser. No. 269,710
Claims priority, application Switzerland, Apr. 10, 1962, 4,336/62
10 Claims. (Cl. 8—55)

The present invention concerns a process for the dyeing and printing of synthetic materials made from polymerized or co-polymerized acrylonitrile. It also concerns, as industrial product, the materials fast-colored by the new process.

Polymerized and co-polymerized acrylonitrile materials which comprise, in particular, fibrous goods suitable as body or substrate material in the process according to the invention have been described, for instance, in "Polymers and Co-Polymers of Acrylonitrile," in Technical Bulletin A2830, published by American Cyanamid Company, Bound Brook, N.J., and shall be referred to hereinafter, for the sake of brevity, as "polyacrylonitrile material" or "polyacrylonitrile fibers."

Hitherto, such material has been dyed or printed with basic dyestuffs, among which particularly indolyl methine dyestuffs, especially of the indolyl-styryl type have been used for obtaining red shades.

Since this particular class of methine dyestuffs having a styryl moiety is simpler to produce than the other class of methine dyes, the art endeavoured, for some time, to find suitable dyes possessing a styryl moiety and endowed with shades other than red, while having similarly good fastness properties, in particular light fastness, as the above-mentioned red indolyl-styryl dyes.

However, methine dyes having a styryl moiety in which the indolyl-moiety is replaced by an imidazolyl, pyrazolyl, indazolyl, triazolyl, thiazolyl, benzthiazolyl, oxazolyl, benzoxazylyl, thiodiazolyl, oxdiazolyl radical or with comparable dyestuffs of the azinyl series which contain a pyridinyl, benzpyridinyl or a pyrimidinyl radical, yield dyeings or prints on polyacrylonitrile material which have such inferior fasteness to light that they are industrially useless in the dyeing and printing of polyacrylonitrile fibers.

It is, therefore, an object of the present invention to provide a process for the dyeing and printing of polyacrylonitrile material with certain methine dyestuffs, in red to yellow shades, leading to dyed goods which are free from the above-mentioned drawbacks.

The above-stated object is attained in the process according to the invention which is based on our discovery that, unexpectedly, dyeings and printings on polyacrylonitrile materials, especially on polyacrylonitrile fibers with perimidinyl-hemicyanines which are color salts of cations of perimidyl-styryl dyestuffs free from any groups which dissociate in acid medium such as carboxylic acid and sulfonic acid groups, and which fall under the general Formula I

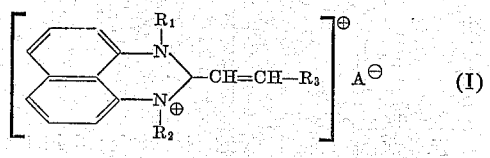

wherein $R_1$ represents a lower alkyl radical having from 1 to 4 carbon atoms, $R_2$ represents a lower alkyl, hydroxy-lower alkyl or an aralkyl radical, preferably benzyl, $R_3$ represents a carbocyclic, preferably mononuclear, aromatic radical containing a nucleophilic substituent and which can be further substituted as described, and A represents the equivalent of an anion of a strong acid, are of pure yellow to red shade and distinguished by good to excellent light fastness, which is at least equal to that attained with the known indolylmethine dyestuffs, and which are, furthermore, completely free from the undesirable lack of proton stability.

The above formula is so to be understood that it is not limited to the electromer shown but all other electromeric structures fall under the same formula, as used in this specification and in the appended claims.

The anions of these color salts, which are advantageously uncolored and thus do not influence the dyestuff character of the salts, are derived in particular from strong inorganic or organic, inclusive of complex acids, e.g. hydrohalic acids, sulfuric acid, sulfuric acid monoalkyl esters, perchloric acid or zinc chloride-hydrochloric acid ($H_4ZnCl_6$), strong aliphatic carboxylic acids such as oxalic acid, or aromatic sulfonic acids such as benzene sulfonic acid or toluene sulfonic acid.

In the perimidinyl-hemicyanine dyestuffs of general Formula I which are usable in the process according to the invention, $R_1$ is, for example, the methyl, ethyl, n-propyl or n-butyl group; $R_2$ is, for example, the methyl or ethyl group, or also a further substituted alkyl group such as the hydroxyethyl, or the benzyl group. For technical and economic reasons $R_1$ and $R_2$ advantageously are the same alkyl radicals having at most two carbon atoms. In a carbocyclic aromatic radical $R_3$ containing a nucleophilic substituent the latter preferably takes the p-position to the —CH=CH— linkage.

Amino groups which may be substituted such as the dimethylamino, diethylamino, ethyl-(2-hydroxyethyl)-amino-, di-(2-hydroxyethyl)-amino, ethyl-(2-cyanoethyl)-amino, ethyl-(2-chloroethyl)-amino group, the piperidino or morpholino group, and, to a lesser degree, a hydroxyl or lower alkoxy group such as the methoxy or ethoxy group are particularly suitable as nucleophilic substituents.

"Lower" in connection with alkyl and the like radicals as used in this specification and the appended claims means radicals with from 1 to maximally 4 carbon atoms.

The color salt of the formula

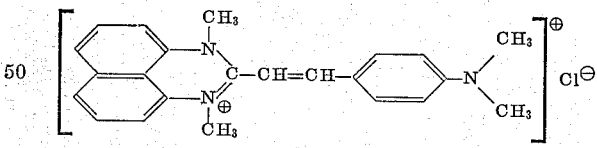

has already been used in photographic sensitizers, but is rather unsatisfactory due to a so-called veiling effect, caused by its presence in the photographic layers.

Particularly valuable for the purpose of the present invention, however, are the dyestuffs which are represented by the formula

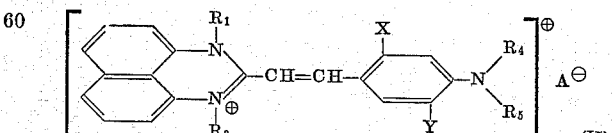

wherein $R_1$ and A have the meanings given in Formula I, $R_2'$ is a lower alkyl, hydroxy-lower alkyl or benzyl radical, $R_4$ is a lower alkyl, a β-hydroxy-lower alkyl, a lower alkoxy-lower alkyl or a β-cyano-lower alkyl radical, $R_5$ is a lower alkyl, lower alkoxy, chloro-lower alkyl, bromo-lower alkyl, phenyl, lower alkylphenyl, hydroxyphenyl, lower alkoxy phenyl, fluorophenyl, bromophenyl, chlorophenyl, benzyl, hydroxy-lower alkyl, or lower alkoxy-lower alkyl, X is hydroxy, chloro, bromo, lower alkoxy, or lower alkyl; and Y represents either hydrogen or hydroxy, chloro, bromo, lower alkyl or lower alkoxy.

X and Y, having the above meanings, are referred to in the appended claims as "shade-influencing substituents," for the sake of brevity.

In these preferred dyestuffs, $R_5$ can, for example, be the methyl, ethyl, propyl, 2-hydroxyethyl, 2-chloroethyl, benzyl phenyl, 4-methoxyphenyl or 4-ethoxyphenyl group. $R_4$ is an alkyl radical which may be substituted such as the methyl, ethyl, propyl, 2-hydroxyethyl or 2-cyanoethyl radical. $R_4$ and $R_5$ together with the nitrogen atom to which they are bound can also form a heterocyclic ring such as the piperidino or the morpholino group. Independently of each other, X and Y are preferably each a lower alkyl group such as the methyl or ethyl group, the hydroxyl group, a lower alkoxy group such as methoxy or ethoxy group, or fluorine, chlorine or bromine. Of these preferred perimidinyl-hemicyanine dyestuffs, those are particularly valuable in which Y is hydrogen and X is a lower alkyl or alkoxy group such as the methyl or methoxy group or, particularly, chlorine or bromine.

The perimidinyl-hemicyanines usable according to the invention are produced, for example, as follows: 2-methyl-perimidinium salts of the general Formula III are condensed with aldehydes of the general Formula IV

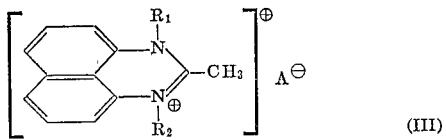

(III)

wherein $R_1$, $R_2$, A and $R_3$ have the meanings given in Formula I. The condensation is performed by methods known per se, e.g. in boiling anhydrous ethanol in the presence of catalytic amounts of piperidine or in the presence of a mixture of equimolar amounts of piperidine and acetic acid. The perimidinyl-hemicyanines separate out in crystalline form. They are purified, if necessary, by re-crystallization from organic solvents or by precipitation from aqueous solution with the aid of salts of strong organic or inorganic acids; they can also be isolated in the form of the double salts, e.g. as zinc chloride double salts which are distinguished by their good crystalizing power and can be used direct for dyeing.

2-methyl-perimidinium salts which can be used as starting materials are, e.g. the chlorides, bromides, methosulfates or p-toluene sulfonates of 1,2,3-trimethyl-, 1,2-dimethyl-3-ethyl-, 1,3-diethyl-2-methyl-, 1,2-dimethyl-3-benzyl-, 1,2-dimethyl-3-(2′-hydroxyethyl)-, 1,2-dimethyl-3-propyl-, 1,2-dimethyl - 3 - butyl-perimidinium cation. These products are obtained by alkylating or aralkylating 2-methyl-perimidine (see Sachs, Annalen 365, p. 35 (1909)).

The aldehydes which serve as second starting material for the production of perimidinyl-hemicyanines usable according to the invention are, for example, 4-N,N-dimethylamino-benzaldehyde, 4 - N,N - diethylamino-benzaldehyde, 4-N-ethyl-N-(2′-hydroxy)-amino-benzaldehyde, 4-N-ethyl-N - (2′-chloroethyl) - amino - benzaldehyde, 4-N,N-dimethylamino-3-methyl-benzaldehyde, 4-N,N-dimethylamino - 3 - chloro-benzaldehyde, 4-N,N-dimethyl-amino - 2 - chloro-benzaldehyde, 4-N,N-dimethylamino-2-bromo - benzaldehyde, 4-N,N-dimethylamino-3-methoxy-benzaldehyde, 4-N,N-dimethylamino-2-hydroxy-benzaldehyde, 4-N,N-dimethylamino - 2 - methoxy-benzaldehyde, N-(4′-formylphenyl)-morpholine, or 4-methylal-4′-ethoxy-N-methyl-diphenylamine.

In the process according to the invention, the perimidinyl-hemicyanine dyestuffs are used advantageously as salts of strong inorganic or organic acids. As such they are soluble in water with a more or less neutral reaction. In hot, weakly acid, neutral or weakly alkaline baths they dye fibers consisting of polymeric or copolymeric synthetic materials produced mainly from acrylonitrile. Such fibers are, e.g. the commercial products "Crylor" of Rhodiaceta S.A. (Lyons, France), "Dralon" of Bayer A.G.) Dormagen/Niederrhein, Germany), "Orlon 42" of Du Pont de Nemours Inc. (Wilmington/Del., U.S.A.), "Nymcrylon" of N.V. Kunstzijdespinnerij Nyma (Nijmwegen, Holland), "Acrilan" of Chemstrand (Decatur/Ala., U.S.A.).

Such fibers or textiles made up therefrom are dyed advantageously from a dyebath at boiling temperature, possibly under pressure, in a pH range which can vary, e.g. from 2 to 9 but which is preferably between 3 and 5. It is best to add the necessary acids, e.g. acetic acid, formic acid, sulfuric acid, phosphoric acid or naphthalene sulfonic acid, to the dyebath at the beginning. Under the usual dyeing conditions, the baths, to which, if necessary, also non-ionogenic wetting or dispersing agents and/or levelling agents or carriers are added, are substantially exhausted within normal dyeing times.

The perimidinyl-hemicyanine dyestuffs used according to the invention produce pure yellow to red dyeings on polyacrylonitrile fibers and fabrics such as, e.g. Orlon 42. The dyeings are distinguished by particularly good fastness properties, mainly by good fastness to pressing and pleating, very good wet-fastness properties and by a good, and often excellent, fastness to light.

The following non-limitative examples serve to illustrate the invention further. In these examples, the temperatures are given in degrees centigrade; the parts are given as parts by weight, the relationship of which to parts by volume is as that of kilograms to liters.

*Example 1*

0.5 part of the dyestuff

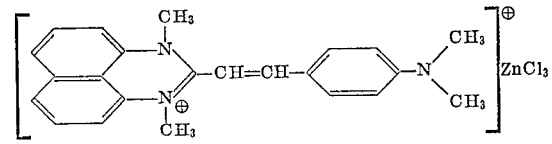

is pasted with 0.5 part of 80% acetic acid and dissolved in 4000 parts of hot water. 1.0 part of 80% acetic acid, 2 parts of sodium acetate and 4 parts of a condensation product of olein alcohol and 15 mols of ethylene oxide are added. The pH of this solution is about 4.5. 100 parts of a polyacrylonitrile fiber made up by 85 to 90% by weight of acrylonitrile and the balance of vinyl chloride copolymer (for instance, Orlon fibers) are introduced at 40°, the temperature is raised within 15 minutes to 100° and dyeing is performed for 1 hour at the boil. The dyebath is completely exhausted at the end of this time. The dyed goods are treated for 15 minutes at 80° with, in aqueous solution, 5 parts of a fatty alcohol sulfonate, and then rinsed and dried. The resulting polyacrylonitrile fibers, which have been dyed a vivid yellow shade, have excellent fastness to washing and light.

The dyestuff used above is obtained by condensation of 1,2,3-trimethyl-perimidinium chloride and 4-N,N-dimethylamino-benzaldehyde in boiling anhydrous ethanol in the presence of a few drops of piperidine. It is isolated by filtering the reaction mass which has been cooled to 0°, dissolving the condensation product in warm water and precipitating the color salt with the aid of zinc chloride and sodium chloride.

If, instead of the dyestuff mentioned in the example, a condensation product of 1,2-dimethyl-3-ethylperimidinium chloride, 1,2-dimethyl-3-(2-hydroxyethyl)-perimidinium chloride, 1,3-diethyl-2-methyl-peridinium chloride or 1,2-dimethyl-3-benzyl-peridinium bromide with 4-N,N-dimethylamino-benzaldehyde is used, then polyacrylonitrile fiber material which is dyed a very fast yellow is obtained.

*Example 2*

0.5 part of the dyestuff

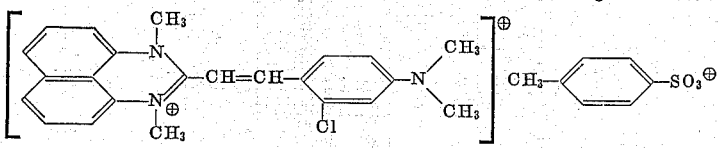

is added to a solution of 4 parts of a condensation product of hexadecyl-diethylenetriamine and 20 mols of ethylene oxide in 4000 parts of water, said solution having a temperature of about 50°. The pH of the dyebath so obtained is about 6.5. 100 parts of a polyacrylonitrile fiber material similar to that used in the preceding example, such as Dralon fiber, are introduced at 40°, the temperature is raised within 15 minutes to 95 to 100° and then dyeing is performed for 30 minutes at the boil. The goods are soaped, rinsed and dried. In this way, Dralon fibers dyed vivid yellow are obtained which are excellently fast to washing and light.

Similar results are also obtained by dyeing in a lower pH range, for example by adding dilute hydrochloric acid or sulfuric acid to the dyestuff solution, such as at a pH of 2 and 3. In all cases, the dyeings have the same shade and the same good fastness properties.

The above dyestuff is produced by condensing 1,2,3-trimethyl-perimidinium-p-toluene sulfonate and 2-chloro-4-N,N-dimethyl-benzaldehyde in boiling anhydrous ethanol in the presence of a little piperidine.

Similarly fast dyeings are obtained if Dralon fibers are dyed under the conditions described above with the condensation products of 1,2-3-trimethyl-perimidinium-p-toluene sulfonate and 2-chloro-4-N,N-dimethylamino-benzaldehyde, 2-chloro-4-N-ethyl-N-(2' - hydroxyethyl)-aminobenzaldehyde, 2-chloro-4-N-ethyl-N-(2'-chloroethyl)-amino benzaldehyde, 2-bromo-4-N,N-dimethylamino-benzaldehyde or 2-methyl-5-chloro-4-N,N'-dimethylamino-benzaldehyde; 1-ethyl-2-methyl-3-n-propyl-perimidinium-p-toluene sulfonate and 2-hydroxy-4-N-ethyl-4-N-phenyl-amino-benzaldehyde, 2,5-dimethyl-4-N-ethyl-4-N-benzyl-amino benzaldehyde, 2,5-di-ethoxy-4-N,N-diethylamino benzaldehyde, 1,3-diethyl-2-methyl-perimidinium chloride, with 4-N,N-diethylamino-benzaldehyde, 2-chloro-4-N,N-diethylamino-benzaldehyde, 2-bromo-4-N-oxethyl-N-ethylamino - benzaldehyde, 4-morpholino-benzaldehyde, 4-piperidino-benzaldehyde, 4-N-ethyl-N-cyanethyl-benzaldehyde, 4-N-ethyl-N-cyanethyl-benzaldehyde, 4-N,N-di-cyanethyl-benzaldehyde, 4-N-methyl-N-(4'-methyl-phenyl)-amino-benzaldehyde, 4-N-methyl-N-(4'-hydroxyphenyl)-amino-benzaldehyde, 4-N-methyl-N-(4'-methoxyphenyl)-amino-benzaldehyde, 4-N-ethyl-N-(4'-fluorophenyl)-amino-benzaldehyde, 4-N-methyl-N-(4'-chlorphenyl)-amino-benzaldehyde, 4-N-methyl-N-(4' - bromphenyl) - amino-benzaldehyde.

*Example 3*

0.5 part of the dyestuff

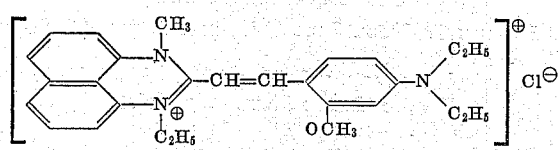

is pasted with 0.5 part of 80% acetic acid and then 4000 parts of warm water are added. 2 parts of sodium acetate, 1 part of 80% acetic acid and 4 parts of a condensation product of olein alcohol and 15 mols of ethylene oxide are added to the solution so obtained. 100 parts of the same polyacrylonitrile fibers as used in Example 1 (for instance, Orlon 42), are introduced at 50°, the temperature is raised within 15 minutes to 100° and dyeing is performed at the boil for 1 hour. The dye liquor is practically completely exhausted after this time. The goods are thoroughly soaped, washed and dried. A pure yellow colored Orlon 42 fiber is obtained which has excellent fastness to washing and light.

The dyestuff used above is obtained by condensing 1,2-dimethyl-3-ethyl-perimidinium chloride and 2-methoxy-4-N,N-diethylamino-benzaldehyde in boiling anhydrous ethanol in the presence of a mixture of equimolar amounts of piperidino and acetic acid.

Similar dyeings are obtained on using the condensation products of 1,2,3-trimethyl-perimidinium chloride and 2-methyl-4-N,N-dimethylamino-benzaldehyde, 2-methyl-4-N-ethyl-N-(β-chloroethyl)-amino-benzaldehyde, 2-methoxy-4-N-ethyl-N-(β-hydroxyethyl)-amino-benzaldehyde or 2-chloro-5-methyl-4-N,N-dimethylamino-benzaldehyde.

*Example 4*

0.5 part of the color salt described in Example 2 is rubbed with 0.5 part of 80% acetic acid and dissolved in 3000 parts of 50° warm water. After adding 3 parts of a condensation product of olein alcohol and 15 mols of ethylene oxide and 9 parts of urea, 100 parts of a commercially available polyacrylonitrile fiber similar to that used in Example 1, namely Acrilan, are introduced. The pH of the liquor is about 6.5. The temperature is raised to 95 to 100° within 30 minutes and then dyeing is performed for 1 hour at the boil. The bath is practically exhausted at the end of this time and its pH has risen to 7.5 to 8. The material, which has been dyed yellow, is thoroughly soaped for 15 minutes at 80°, rinsed and dried. The Acrilan fiber, which has been dyed a deep yellow shade, has excellent fastness to wet and light.

Formulae of other perimidinyl-hemicyanine dyestuffs useful according to this invention are as follows:

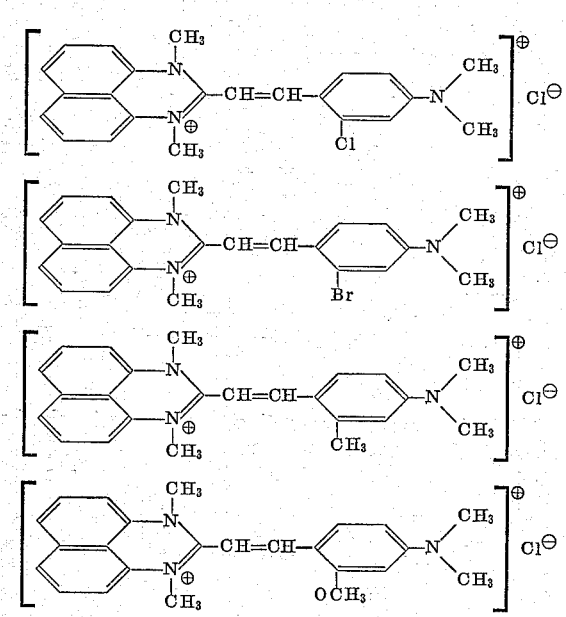

We claim:
1. In a process for the production of polyacrylonitrile fiber material colored fast to light, the improvement com- prising coloring said material in a dyebath containing, as the coloring agent, a salt of the formula

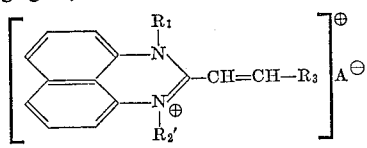

(I)

wherein $R_1$ is a lower alkyl radical $R_2'$ is a member selected from the group consisting of lower alkyl, hydroxy-lower alkyl and benzyl, $R_3$ represents a benzene radical which contains a nucelophilic di-substituted amino group in p-position to the —CH=CH— bridge and, as only further substituents, from 0 to 2 members selected from the group consisting of hydroxy, chloro, bromo, lower alkyl and lower alkoxy, and A represents the equivalent of an anion of a strong acid, while maintaining the bath at a pH of about 2 to 9, and at a temperature above room temperature up to the boiling temperature of the bath.

2. An aqueous dyebath for the dyeing of polyacrylonitrile fibers, the essential ingredients of which are:
   (a) a compound of the formula

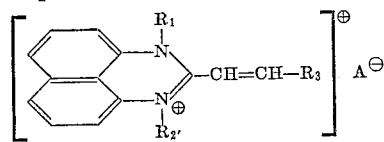

(I)

wherein $R_1$ is a lower alkyl radical $R_2'$ is a member selected from the group consisting of lower alkyl, hydroxy-lower alkyl and benzyl, $R_3$ represents a benzene radical which contains a nucleophilic di-substituted amino group in p-position to the —CH=CH— bridge and, as only further substituents, from 0 to 2 members selected from the group consisting of hydroxy, chloro, bromo, lower alkyl and lower alkoxy, and A represents the equivalent of an anion of a strong acid, in an amount depending on the desired depth of shade of the dyeings to be produced therein;
   (b) acetic acid in an amount which, in the case of an acid of 80% —CH$_3$COOH content, corresponds to 1.5 parts by weight per 4000 parts of water;
   (c) about 4 parts by weight per 4000 parts of water, of a condensation product of oleyl alcohol and about 15 moles of ethylene oxide, and
   (d) a buffer salt.

3. The improvement according to claim 1 wherein the said salt is the salt of the formula

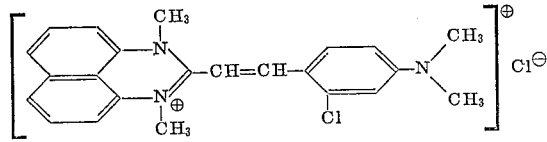

4. The improvement according to claim 1 wherein the said salt is the salt of the formula

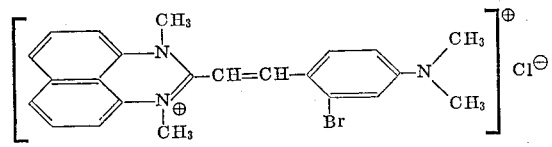

5. The improvement according to claim 1 wherein the said salt is the salt of the formula

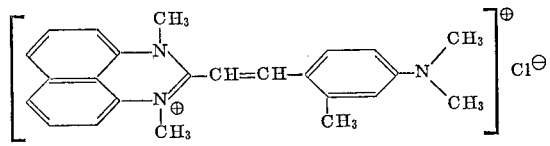

6. The improvement according to claim 1 wherein the said salt is the salt of the formula

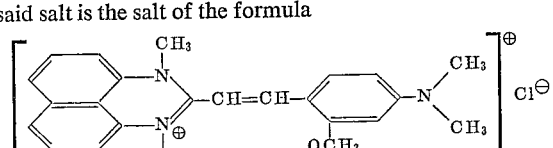

7. An aqueous dyebath according to claim 2 wherein compound I is the compound of the formula

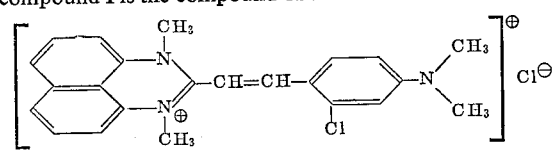

8. An aqueous dyebath according to claim 2 wherein compound I is the compound of the formula

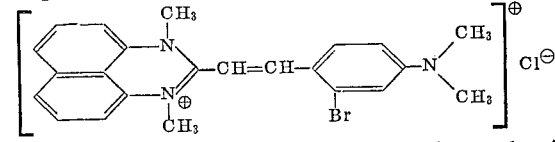

9. An aqueous dyebath according to claim 2 wherein compound I is the compound of the formula

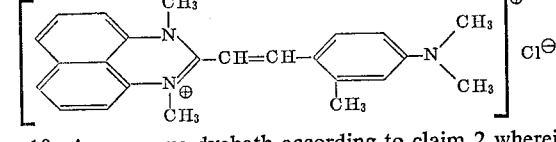

10. An aqueous dyebath according to claim 2 wherein compound I is the compound of the formula

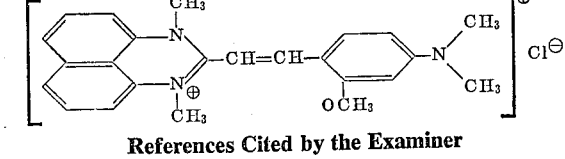

References Cited by the Examiner

UNITED STATES PATENTS

| | | | |
|---|---|---|---|
| 2,494,032 | 1/50 | Brooker et al. | 260—240.9 |
| 2,772,943 | 12/56 | Hiller. | |
| 2,840,443 | 6/58 | Smith | 8—55 |
| 2,906,588 | 9/59 | Brunkhorst et al. | |
| 2,989,361 | 6/61 | Hess. | |
| 3,119,806 | 1/64 | Voltz et al. | |

FOREIGN PATENTS 1,044,022  11/58  Germany.

OTHER REFERENCES

Jeffreys: J. Chem. Soc., 1955, part 3, pages 2394 to 2397.

Chemical Abstracts, vol. 50, col. 11, 865c (1956), abstract of Jeffreys, Industrie Chim. Belg., vol. 20, Spec. No. 618–21 (1955).

NORMAN G. TORCHIN, *Primary Examiner.*

JOHN D. RANDOLPH, *Examiner.*